(12) United States Patent
Yonebayashi et al.

(10) Patent No.: US 9,818,131 B2
(45) Date of Patent: Nov. 14, 2017

(54) ANONYMOUS INFORMATION MANAGEMENT

(71) Applicant: LiveRamp, Inc., San Francisco, CA (US)

(72) Inventors: Takashi Yonebayashi, San Francisco, CA (US); Jeremy Lizt, San Francisco, CA (US); Stephen Travis May, San Francisco, CA (US)

(73) Assignee: LiveRamp, Inc., San Francisco, CA (US)

( * ) Notice: Subject to any disclaimer, the term of this patent is extended or adjusted under 35 U.S.C. 154(b) by 454 days.

(21) Appl. No.: 13/838,151

(22) Filed: Mar. 15, 2013

(65) Prior Publication Data

US 2014/0278972 A1 Sep. 18, 2014

(51) Int. Cl.
*G06Q 30/00* (2012.01)
*G06Q 30/02* (2012.01)

(52) U.S. Cl.
CPC ................................ *G06Q 30/0255* (2013.01)

(58) Field of Classification Search
CPC combination set(s) only.
See application file for complete search history.

(56) References Cited

U.S. PATENT DOCUMENTS

| 5,274,547 | A | 12/1993 | Zoffel |
| 5,944,787 | A | 8/1999 | Zoken |
| 6,327,574 | B1 | 12/2001 | Kramer |
| 6,938,163 | B1 * | 8/2005 | Birkler ............... G06F 21/6209 713/193 |
| 7,213,032 | B2 | 5/2007 | Mascarenhas |
| 7,249,034 | B2 | 7/2007 | Schirmer |

(Continued)

FOREIGN PATENT DOCUMENTS

| JP | 2008-134769 | 6/2008 |
| KR | 10-2012-0053296 | 5/2012 |
| WO | 2015/038948 | 3/2015 |

OTHER PUBLICATIONS

Gauch, Susan et al., ProFusion: Intelligent Fusion from Multiple, Distributed Search Engines1, Oct. 1996, Google Scholar, 637-649.

(Continued)

Primary Examiner — Matthew T Sittner (57) ABSTRACT

An anonymous information system (AIS) maintains privacy for internet users by separating personally identifiable information (PII) and user browser history. The AIS may receive a hashed email address from a publisher website. The AIS system may double hash the email address and discard the hashed email address received from the publisher. The double hashed email address is decoupled from user PII and may be used for tracking the number of unique email addresses provided by the publisher website. The AIS system also may associate the hashed email address with a consumer file. The AIS may hash an entity identifier associated with the consumer file to create a non-reversible anonymous identifier (anonymous ID). The anonymous ID may be associated with segment information in the consumer file that does not contain PII about the user. The AIS may send customized information to users based on the segment information.

12 Claims, 7 Drawing Sheets

(56) References Cited

U.S. PATENT DOCUMENTS

| | | | |
|---|---|---|---|
| 7,346,844 B1* | 3/2008 | Baer | G06Q 30/0603 434/362 |
| 7,603,317 B2* | 10/2009 | Adler | G06F 21/6245 705/51 |
| 7,853,614 B2 | 12/2010 | Hoffman | |
| 8,010,460 B2 | 8/2011 | Work et al. | |
| 8,131,745 B1 | 3/2012 | Hoffman | |
| 8,468,271 B1 | 6/2013 | Panwar | |
| 8,620,942 B1 | 12/2013 | Hoffman | |
| 8,621,282 B1* | 12/2013 | Mixter | G06F 11/0706 714/38.11 |
| 2002/0026581 A1 | 2/2002 | Matsuyama | |
| 2002/0049529 A1* | 4/2002 | Ikeda | G01C 21/26 701/461 |
| 2002/0065891 A1 | 5/2002 | Malik | |
| 2002/0156895 A1 | 10/2002 | Brown | |
| 2003/0192004 A1* | 10/2003 | Gopalakrishnan | H04L 1/0072 714/758 |
| 2003/0237093 A1 | 12/2003 | Marsh | |
| 2004/0139330 A1 | 7/2004 | Baar | |
| 2004/0143738 A1* | 7/2004 | Savage | G06Q 20/383 713/168 |
| 2004/0205008 A1* | 10/2004 | Haynie | G06Q 10/10 705/31 |
| 2005/0159970 A1 | 7/2005 | Buyukkokten et al. | |
| 2005/0192863 A1* | 9/2005 | Mohan | G06Q 30/0277 705/14.19 |
| 2005/0267973 A1 | 12/2005 | Carlson et al. | |
| 2006/0036857 A1* | 2/2006 | Hwang | G06F 21/31 713/168 |
| 2006/0179113 A1 | 8/2006 | Buckingham | |
| 2006/0224447 A1* | 10/2006 | Koningstein | G06Q 30/02 705/14.13 |
| 2006/0224675 A1 | 10/2006 | Fox | |
| 2007/0008066 A1 | 1/2007 | Fukuda | |
| 2007/0027930 A1 | 2/2007 | Alvarado et al. | |
| 2007/0073888 A1 | 3/2007 | Madhok | |
| 2007/0143407 A1 | 6/2007 | Avritch et al. | |
| 2007/0143469 A1 | 6/2007 | Adams et al. | |
| 2008/0092182 A1* | 4/2008 | Conant | H04N 7/17318 725/109 |
| 2008/0104495 A1 | 5/2008 | Craig | |
| 2008/0109306 A1* | 5/2008 | Maigret | G06F 21/10 705/14.46 |
| 2008/0154877 A1* | 6/2008 | Joshi | G06F 17/30637 |
| 2008/0162157 A1 | 7/2008 | Daniluk | |
| 2008/0184366 A1 | 7/2008 | Alperovitch et al. | |
| 2008/0235772 A1 | 9/2008 | Janzen | |
| 2008/0285464 A1 | 11/2008 | Katzir | |
| 2008/0288658 A1 | 11/2008 | Banga et al. | |
| 2009/0168995 A1 | 7/2009 | Banga et al. | |
| 2009/0248523 A1* | 10/2009 | Hueter | G06Q 10/00 705/14.53 |
| 2009/0254971 A1 | 10/2009 | Herz et al. | |
| 2009/0276233 A1 | 11/2009 | Brimhall | |
| 2009/0281852 A1* | 11/2009 | Abhari | G06Q 30/02 705/14.16 |
| 2010/0042466 A1* | 2/2010 | Pritchard | G06Q 30/02 705/14.7 |
| 2010/0042497 A1* | 2/2010 | Pritchard | G06Q 30/02 705/14.49 |
| 2010/0042930 A1* | 2/2010 | Pritchard | G06Q 30/02 715/738 |
| 2010/0076987 A1 | 3/2010 | Schreiner | |
| 2010/0088313 A1 | 4/2010 | Hoffman | |
| 2010/0094758 A1* | 4/2010 | Chamberlain | G06Q 10/06375 705/50 |
| 2010/0225607 A1 | 9/2010 | Kim | |
| 2010/0312706 A1* | 12/2010 | Combet | G06Q 30/0204 705/50 |
| 2011/0004504 A1 | 1/2011 | Ives et al. | |
| 2011/0071895 A1* | 3/2011 | Masri | G06Q 30/0207 705/14.27 |
| 2011/0082824 A1* | 4/2011 | Allison | G06N 99/005 706/20 |
| 2011/0099202 A1* | 4/2011 | Dedeoglu | G06F 17/30702 707/780 |
| 2011/0184828 A1 | 7/2011 | Siegel | |
| 2011/0287741 A1 | 11/2011 | Prabhu | |
| 2011/0314092 A1* | 12/2011 | Lunt | G06F 17/30876 709/203 |
| 2012/0044156 A1 | 2/2012 | Michaelis | |
| 2012/0268248 A1 | 10/2012 | Hiraide | |
| 2013/0006766 A1 | 1/2013 | Dedeoglu | |
| 2013/0024242 A1* | 1/2013 | Villars | G06Q 10/00 705/7.33 |
| 2013/0096986 A1* | 4/2013 | Pavagadhi | G06Q 30/0203 705/7.32 |
| 2013/0124628 A1* | 5/2013 | Weerasinghe | G06Q 50/01 709/204 |
| 2013/0159506 A1* | 6/2013 | Stern | G06F 17/30 709/224 |
| 2013/0159826 A1* | 6/2013 | Mason | G06F 17/30873 715/205 |
| 2013/0268773 A1* | 10/2013 | Davis | G06F 21/602 713/189 |
| 2013/0291123 A1* | 10/2013 | Rajkumar | G06F 21/00 726/28 |
| 2014/0032318 A1* | 1/2014 | Hopwood | G06Q 30/02 705/14.53 |
| 2014/0040463 A1* | 2/2014 | Skvortsov | H04L 43/0876 709/224 |
| 2014/0095297 A1* | 4/2014 | O'Reilly | G06Q 30/0246 705/14.45 |
| 2014/0201043 A1* | 7/2014 | Arditi | G06Q 40/10 705/30 |
| 2014/0278972 A1* | 9/2014 | Yonebahashi | G06Q 30/0255 705/14.53 |
| 2014/0344954 A1 | 11/2014 | Kim | |

OTHER PUBLICATIONS

Stolowitz Ford Cowger LLP, Listing of Related Cases, Oct. 9, 2013.
Janez Brank et al., Predictive Algorithms for Browser Support of Habitual User Activities on the Web, 2005, IEEE, 7 pages.
Stolowitz Ford Cowger LLP, Listing of Related Cases, Apr. 10, 2013.
International Search Report dated Dec. 22, 2014 for PCT/US2014/055475; 2 pages.

* cited by examiner

ANONYMOUS INFORMATION MANAGEMENT

TECHNICAL FIELD

The present disclosure relates generally to maintaining internet privacy.

BACKGROUND

A consumer may connect to a website and access information or purchase products and/or services. Some websites may display banner advertisements (banner ads) in downloaded webpages. For example, the website may display a banner ad for a watch company while the consumer is viewing a webpage for an on-line news service.

During a first web session, the consumer may access a first website for the watch company or may use an internet search engine to search for watches. The first website or search engine may provide browser history to an advertising network. The advertising network also may have loaded a third party cookie into the browser that contains a user identifier.

The user may later access a second website for the on-line news service. A webpage on the second website may include a banner ad that connects to the advertising network. The third party cookie may send the user identifier and consumer profile information back to the advertising network. The consumer profile information may contain user browsing history, such as the prior visit to the first watch website.

Seeing that the user previously visited the watch website, the advertising network may assume the user is interested in watches. The advertising network then may send an advertisement from a watch company to the second website for the on-line news service for inserting into the banner ad.

Consumers may have privacy concerns with advertising networks tracking their visits to different websites. For example, consumers may not want personally identifiable information, such as email addresses, linked with their browsing history. However, the advertising network may need to track the consumer browser history to locate the correct advertisements for inserting into the banner ads.

BRIEF DESCRIPTION OF THE DRAWINGS

Embodiments are illustrated in the figures. However, the embodiments and figures are illustrative rather than limiting.

DETAILED DESCRIPTION

In the following description, several specific details are presented to provide a thorough understanding of embodiments. One skilled in the relevant art will recognize, however, that the embodiments can be practiced without one or more of the specific details, or in combination with other components, etc. In other instances, well-known implementations or operations are not shown or described in detail to avoid obscuring aspects of various embodiments of the invention.

An anonymous information system (AIS) maintains privacy for internet users by separating personally identifiable information (PII) from online activity. For example, the AIS may avoid tracking user browser history. At the same time, the AIS also may use generic user segment data to customize advertisements for particular user categories.

The AIS system may receive a hashed email address from a publisher website. The AIS system may double hash the email address and discard the hashed email address received from the publisher. The double hashed email address is decoupled from user PII and may be used for tracking the number of unique email addresses provided by the publisher website.

The AIS system also may associate the hashed email address with a consumer file. The AIS may hash an entity identifier associated with the consumer file to create a non-reversible anonymous identifier (anonymous ID). The anonymous ID may be associated with segment information in the consumer file that does not contain PII about the user. The anonymous ID and segment data are therefore also decoupled from consumer PIT and the consumer browser history.

Figure 1:
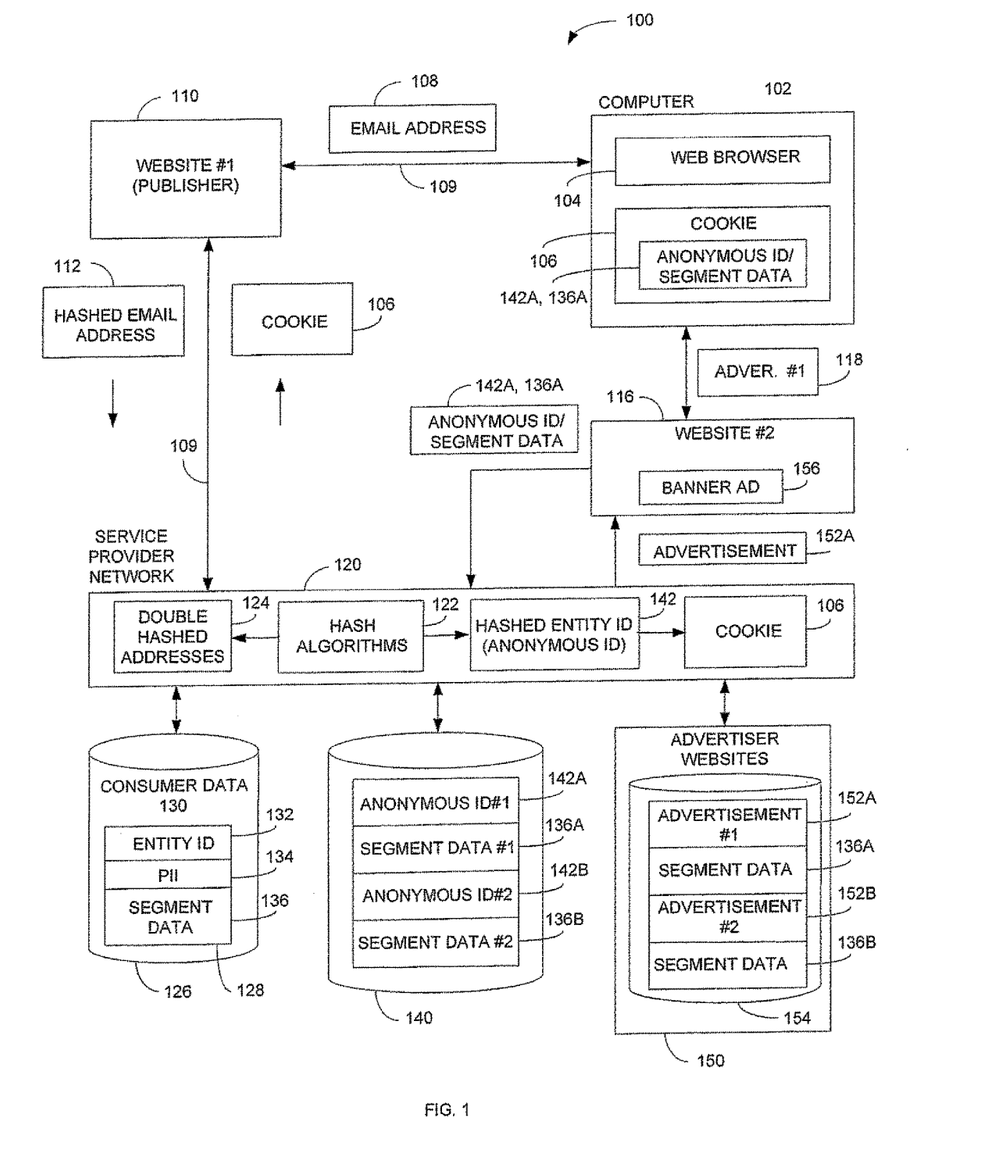
FIG. 1 depicts an example of an anonymous information system.

FIG. 1 depicts an example of an anonymous information system (AIS) 100. A user may use a web browser 104 on a computer 102 to access a website 110. Computer 102 may comprise a smart phone, Personal Digital Assistant (PDA), terminal, personal computer, laptop computer, tablet computer, notebook computer, or any other type of computing device that may need to access website 110.

In one example, computer 102 may operate server based applications within a web browser environment. In another example, computer 102 may operate a native application that at times operates independently from the web application operating on website 110 and at other times exchanges data with the web application.

Website 110 may comprise any combination of software and/or hardware for conducting a web session with computer 102. For example, website 110 may operate a web application for purchasing items or services, playing video games, digital navigation, searching the Internet, etc. These of course are just examples of any function that may be performed between website 110 and computer 102. Website 110 may provide email addresses to a service provider network 120 or advertising network and therefore may be alternatively referred to as a publisher website or a publisher.

Service provider network (SPN) 120 may comprise any combination of server computers and software. In one example, SPN 120 may assemble consumer data 130 extracted from different data sources into consumer files 128. Consumer files 128 may contain personally identifiable information (PII) 134 and segment data 136 associated with a particular entity.

PII 134 may comprise any information that may identify, contact, locate, and/or be associated with a single human, small group of humans (i.e. a household), or entity. For example, PII may comprise a name, an address, a phone number, a fax number, an email address, or the like, or any combination thereof. An email address or phone number may not be explicitly PII, but when grouped together with a name or address may be recognized as PII 134.

Segment data 136 may comprise any generic information that may not uniquely identify any one individual human being, household, or entity. For example, segment data 136 may comprise age, gender, geographic location, demographics, buying habits, or the like, or any combination thereof. Segment data 136 also may include non-identifiable business information such as identifiers for high value consumers with expired or soon to be expired services.

Companies also may submit or push consumer data 130 to SPN 120. For example, a company may send consumer phone numbers, postal addresses, and phone service statuses to SPN 120. SPN 120 may add the company information to associated consumer files 128. One example showing how different consumer data 130 may be extracted and associated with a same user is described in U.S. patent application Ser. No. 12/554,306 filed Sep. 23, 2011, entitled: Data Source Attribution System which is incorporated by reference in its entirety.

SPN 120 may assign a unique entity identifier (entity ID) 132 to each consumer file 128. Entity ID 132 may provide a common identifier for multiple different email addresses, phone numbers, and other PII associated with a same person or entity. Entity ID 132 may be a random or semi-random number and contain no specific PII about the entity associated with consumer file 128. For example, entity identifier 132 may not contain any, name, email address, postal address, or any other PII 134 associated with the consumer.

As mentioned above, website 110 may send or publish email addresses to SPN 120. For example, during a web session with computer 102, website 110 may obtain an email address 108 from the user of computer 102. For example, the user of computer 102 may enter email address 108 into a webpage displayed on web browser 104 for logging into website 110. Website 110 may hash email address 108 and send hashed email address 112 to SPN 120. In another example, website 110 may send other user profile data to SPN 120, such as a name, a postal address, etc.

SPN 120 may use a hash algorithm 122 to hash email address 112 a second time to generate a double hashed email address 124. The double hashed address 124 is decoupled from email address 108 and provides a unique identifier for an anonymous user. SPN 120 may count the number of unique double hashed addresses 124 originating from website 110. SPN 120 then may pay the entity operating website 110 a publication fee based on the number of unique double hashed addresses 124 received from website 110.

SPN 120 may use hashed email address 112, or other PII information from website 110, to identify an associated consumer file 128 in database 126. For example, SPN 120 may use a same hash algorithm 122 as website 110 to hash email addresses in consumer data 130. SPN 120 may identify one of consumer files 128 containing a hashed email address matching hashed email address 112.

SPN 120 may discard hashed email address 112 and any other information that may associate the user of computer 102 with website 110. Since hashed email address 112 is not stored in any SPN databases, no information is retained by SPN 120 associating email address 108 with website 110. In other words, SPN 120 is prevented from tracking the browser history for the user of computer 102.

SPN 120 may hash entity ID 132 in the identified consumer file 128 to create an anonymous ID 142. Anonymous ID 142 cannot be reversed to discover associated PII 134 in the identified consumer file 128. SPN 120 then may associate anonymous ID 142 with segment data 136 in the associated consumer file 128.

For example, SPN 120 may derive a first anonymous ID 142A from a first entity ID 132 associated with a first consumer file 128 and may derive a second anonymous ID 142B from a second entity ID 132 associated with a second consumer file 128. SPN 120 then may associate anonymous ID 142A with segment data 136A from the first consumer file 128 and associate anonymous ID 142B with segment data 13613 from the second consumer file 128.

In one example, segment data 136A may comprise an identifier or flag that associates anonymous ID 142A with a preferred consumer of a company. The company may be alternatively referred to as an advertiser since the company may use segment data 136A to send a customized advertisement to the user of computer 102. Of course, this is just one example, and any segment data 136A that may be contained in consumer file 128 and associated with anonymous identifier 142A.

No PII 134 is associated with the anonymous IDs 142. This decouples anonymous IDs 142 and segment data 136 from PII 134. SPN 120 may store anonymous IDs 142 and associated segment data 136 in a database 140 separate from database 130. This further decouples anonymous identifiers 142 and associated segment data 136 from consumer files 128.

SPN 120 may load an anonymous ID 142 and/or associated segment data 136 into a cookie 106 and load the cookie 106 into browser 104 operating on computer 102. For example, cookie 106 may be loaded into web browser 104 and may contain anonymous ID 142A and segment data 136A that identifies the user of computer 102 as one of the preferred consumers of the above mentioned advertiser. Thus, cookie 106 may not contain information identifying email address 108 or identifying any browser history associated with email address 108.

At some later time, the user of computer 102 may access another website 116, In one example, website 116 may include one or more webpages that include banner advertisements (banner ADs) 156. Cookie 106 may send anonymous ID 142A and/or segment data 136A back to SPN 120 via website 116 in response to web browser 104 loading the webpage on website 116.

In one example, SPN 120 may compare anonymous ID 142A received from cookie 106 with anonymous IDs 140 in database 140. SPN 120 may identify segment data 136 in database 140 associated with the matching anonymous ID. For example, SPN 120 may identify segment data 136A in database 140 associated with matching anonymous ID 142A.

Advertiser websites 150 or SPN 120 may operate a database 154 containing advertisements 152 and associated segment data 136. For example, a first advertisement 152A may be associated with segment data 136A identifying preferred consumers for a first company. A second advertisement 152B may be associated with segment data 136B that identify men within a particular age range that have also visited a third website.

SPN 120 may try to match segment data 136A identified in database 140 or segment data 136A sent from cookie 106 with segment data 136 in database 150. SPN 120 may send website 116 an advertisement 152 from database 154 associated with matching segment data 136. For example, advertisement 152A may be associated with an upgrade offer that may only be sent to the preferred consumers of the advertiser company. Because segment data 136A received from cookie 106 identifies a preferred consumer, SPN 120 sends advertisement 152A to website 116. Website 116 may insert advertisement 152A into banner AD 156 within the webpage currently loaded in web browser 104.

Thus, SPN 120 may send customized advertisements or any other type of information to a selected group of users based on non-PII information. Advertisers are able to reach the selected group of users on-line without any tracking of user browser history.

Figure 2:
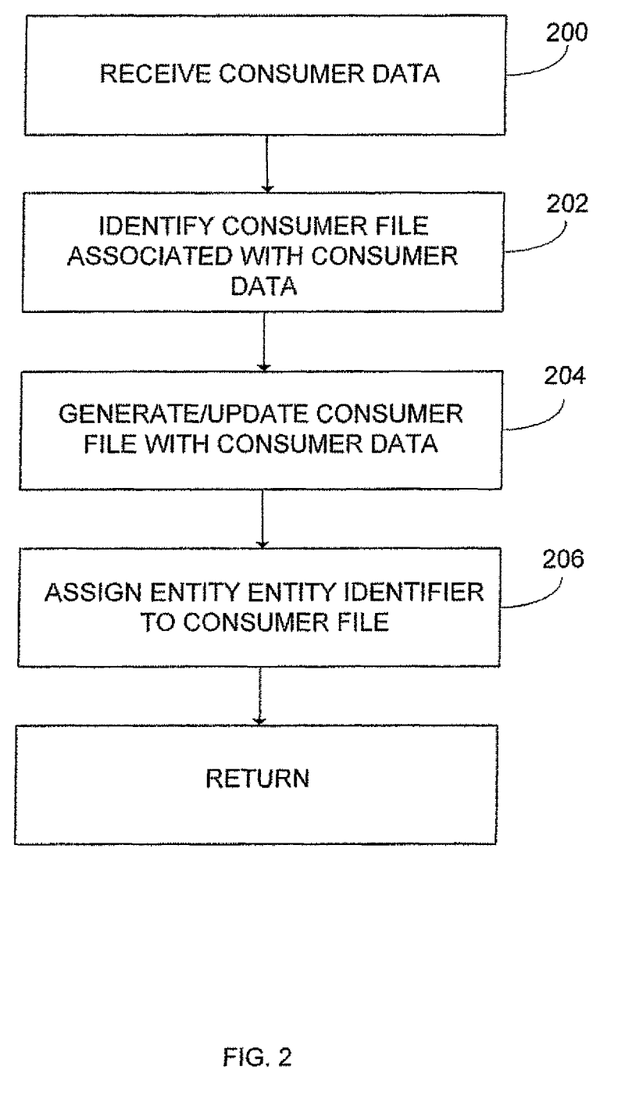
FIG. 2 depicts an example process for accumulating consumer data.

FIG. 2 depicts an example process for generating a consumer file. In operation 200 the SPN may receive consumer data. As explained above, the consumer data may be any PII or segment data that is either extracted from one or more data sources or that is sent to the SPN from one or more data sources. In one example, the consumer data may be sent by an enterprise that wishes to conduct on-line advertising using banner ads. In one example, the consumer data may include PII, such as email addresses and phone numbers for particular customers and segment data, such as identifiers identifying valued consumers. Of course this is just one example type of consumer data.

In operation 202, a consumer file is located for the received consumer data. For example, the email addresses and/or phone numbers may be compared with existing email addresses and phone numbers in an existing consumer database.

In operation 204, consumer files may be created or updated to store the consumer data. For example, a new consumer file may be created for an email address or phone number that does not currently exist in the consumer database. The new consumer file may be loaded with PII that identifies the email address and/or phone number and segment data that identifies the consumer as a valued customer.

When an existing consumer file contains a matching email address and/or phone number, the existing file may be updated to include any missing PII such as a missing email address or phone number. The existing consumer file also may be updated with the new segment data that identifies the entity associated with the consumer file as a valued customer.

In operation 206, an entity identifier is assigned to a new consumer file. For example, a unique random or semi-random number may be assigned to the new consumer file. The entity identifier may uniquely identify an associated consumer file but may not contain any PIT information that could personally identify the entity associated with the consumer file.

Figure 3:
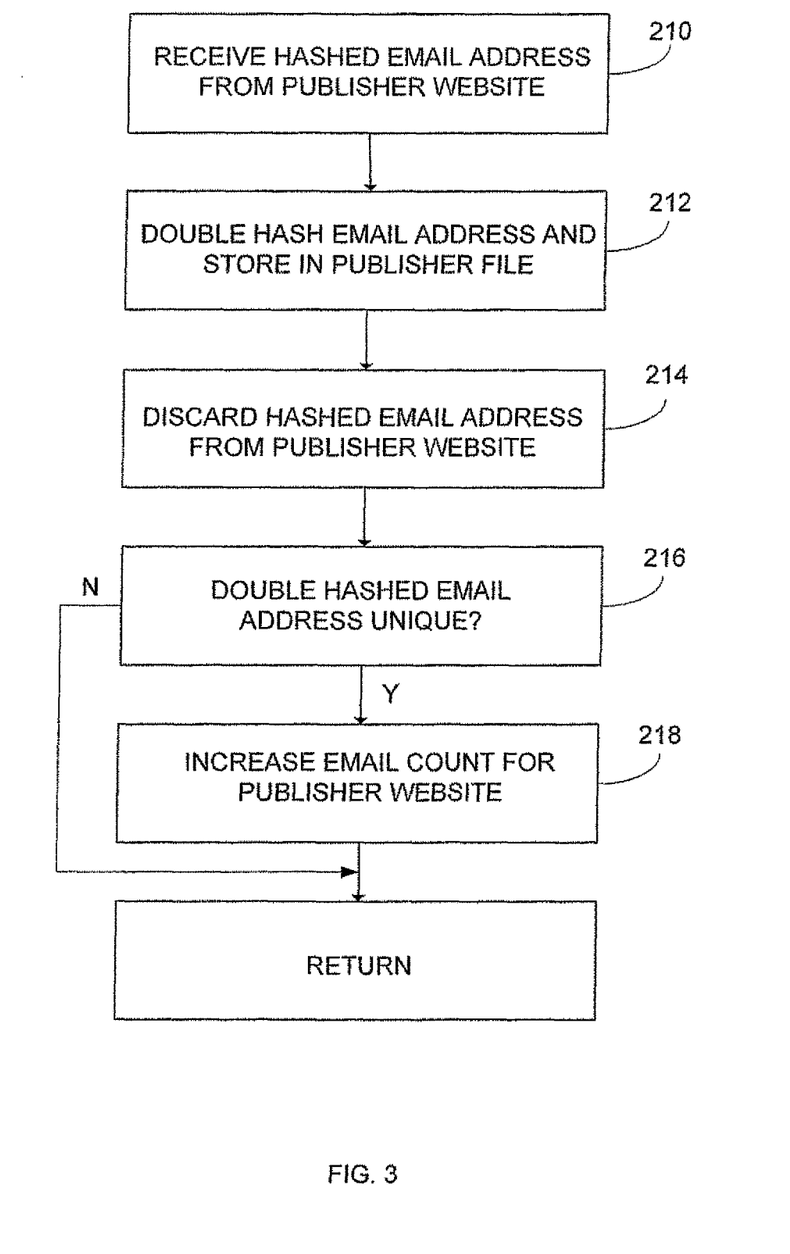
FIG. 3 depicts an example process for double hashing an email address.

FIG. 3 depicts an example process for tracking publication website activity. Operation 210 may receive a hashed email address or some other user identifier from a publisher website. For example, the website may have an agreement with the SPN to supply email addresses received from users. Users may enter an email address into a webpage in order to log into the publisher website. The website may hash the email address and forward the hashed email address to the SPN.

The SPN in operation 212 may double hash the email address. For example, the SPN may hash the hashed email address received from the publisher website a second time. At this point, the double hashed email address may no longer have any identifiable association with any particular consumer or consumer file or with any cookies. However, the double hashed email address does provide a unique identifier that may be distinguished from other double hashed email addresses.

The SPN in operation 214 may discard the hashed email address received from the publisher website. For example, the SPN may delete and never log the hashed email addresses received from the publisher website. This may prevent the SPN from tracking the browser history of the received email address accessing the publisher website.

Operation 216 may determine if the double hashed email address is unique. For example, the SPN may accumulate all of the double hashed email addresses associated with the publisher website into an associated publisher file. Whenever a new hashed email address is received from the same publisher website, the email address is double hashed and the double hashed value compared with other double hashed values in the publisher file.

If the double hashed value already exists in the publisher file in operation 216, the SPN may return to receiving other hashed email addresses in operation 210. If the double hashed value does not currently exist in the publisher file in operation 216, the SPN may increment an email count for the publisher website in operation 218. The email count in operation 218 allows the SPN to determine the number of unique emails received from a particular publisher website. The email count may be used for determining a publication fee paid to the publisher website.

Figure 4:
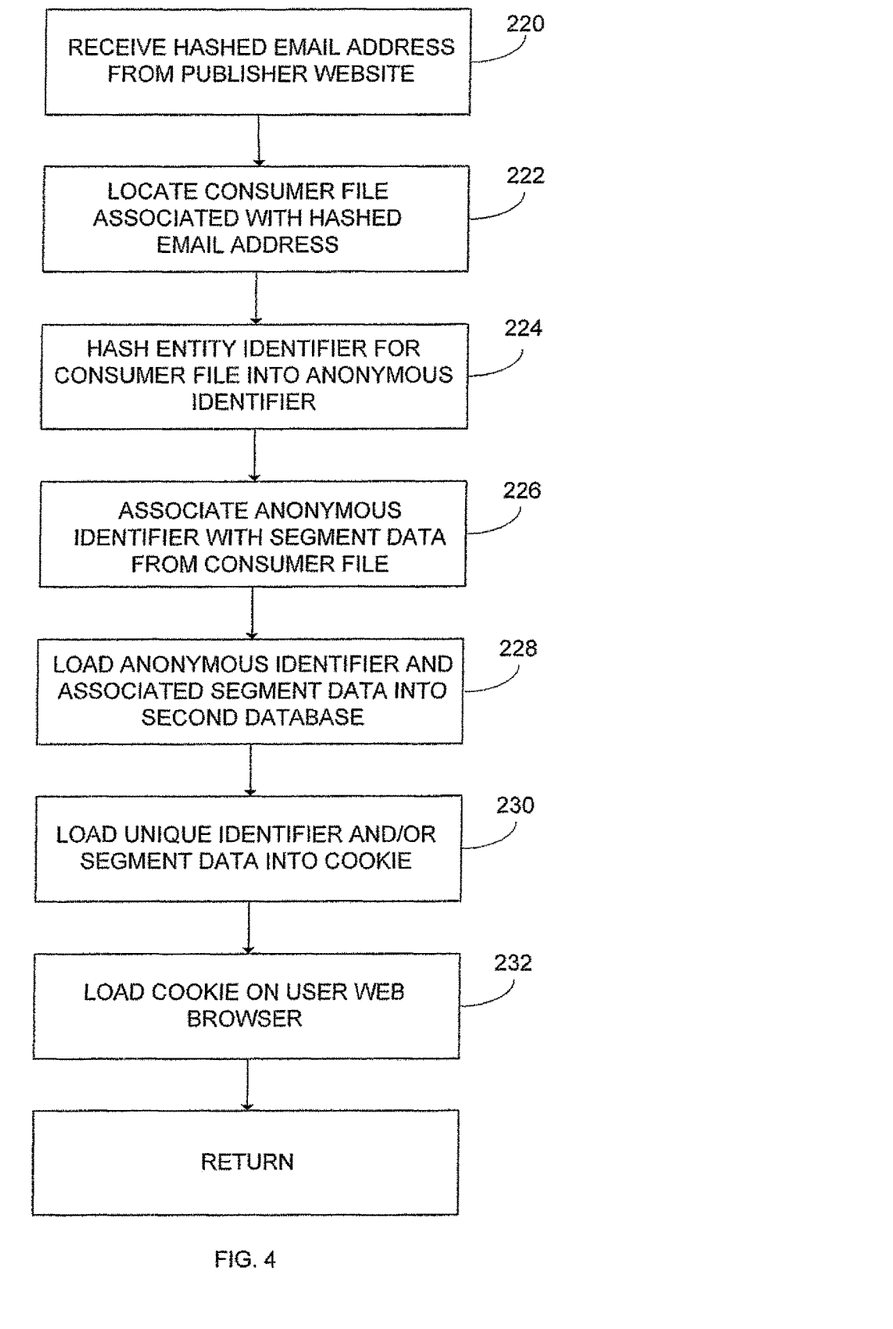
FIG. 4 depicts an example process for generating an anonymous identifier.

FIG. 4 depicts an example process for generating anonymous identifiers. Operation 220 may receive a hashed email address from the publisher website. The SPN in operation 222 may locate a consumer file associated with the hashed email address. For example, the SPN may identify one of the consumer files with a previously hashed email address matching the hashed email address received from the publisher website Operation 224 may hash the entity identifier assigned to the matching consumer file. The hashed entity identifier results in an anonymous identifier for the consumer file and the hashing of the entity identifier may not be reversed and associated with the PII information in any associated consumer file.

The SPN in operation 226 may associate the anonymous identifier with segment data in the associated consumer file. For example, the SPN may load some or all of the segment data from the identified consumer file into a file associated with the anonymous identifier. As mentioned above, segment data also cannot be traced back to any particular individual, entity, or consumer file.

For example, the segment data may contain the information that indicates the consumer is a valued customer. The valued customer identification may not include any personally identifiable information about the consumer and may only comprise a flag or some other non-traceable identifier that indicates the entity associated with the anonymous identifier is considered a valuable consumer of a particular business. Of course the SPN may use any type of non-traceable segment data for associating the anonymous identifier with a particular group of users.

The SPN in operation 228 may load the anonymous identifier and the associated segment data into a second database separated from the database that contains the consumer files that contains PIT. This second database may be alternatively referred to as siloing the anonymous identifiers and associated segment data. The siloing further prevents any association of the anonymous identifiers with PII in the consumer files.

The SPN in operation 232 may load the anonymous identifier and/or the segment data into a cookie. The cookie also may be referred to as a hyper test transport protocol (HTTP) cookie, a web cookie, or a browser cookie. The cookie is usually a small piece of data sent from a website and stored in a web browser while a user is browsing the website. When the user browses the same or another website, the data stored in the cookie may be retrieved by the visited website.

The cookie that contains the anonymous identifier and/or segment data may be sent back to the publisher website that provided the hashed email. The publisher website then may load the cookie into the web browser of the user visiting the publisher website that supplied the original email address.

Figure 5:
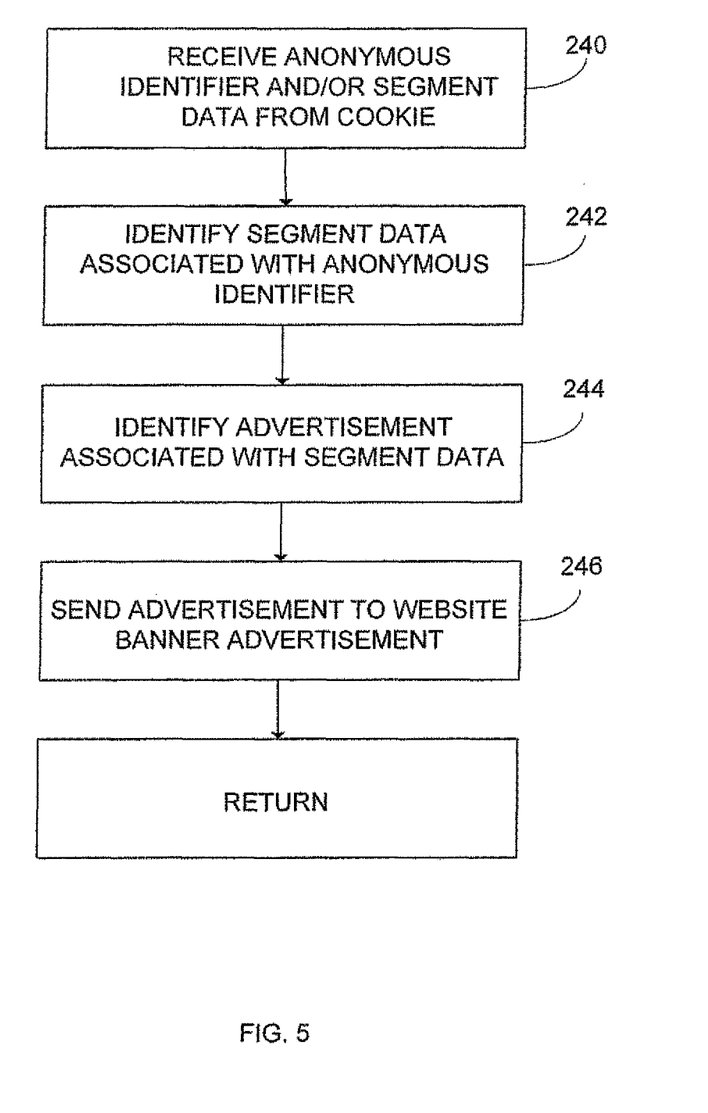
FIG. 5 depicts an example process for associating an anonymous identifier with advertisements.

FIG. 5 depicts an example process for sending customized advertisements to users. The user of the web browser that previously visited the publisher website may visit the same publisher website or may visit another website. In operation 240, the cookie previously loaded into the web browser may send the anonymous identifier and/or associated segment data to the visited website. The visited website may forward the anonymous identifier and/or the segment data received from the cookie to the SPN.

For example, the cookie may send the anonymous identifier and a flag that indicates the user as a valued customer of a particular company. The SPN in operation 244 may identify an advertisement associated with the preferred customer identifier. For example, the company may have previously provided the SPN with an advertisement for sending to valued customers. The SPN in operation 246 may send the company advertisement to the visited website and the visited website may insert the company advertisement into a banner ad in the visited website webpage loaded into the web browser of the user.

In another example, the cookie may only send the anonymous identifier. In operation 242, the SPN may identify segment data in the siloed database associated with the anonymous identifier. For example, the SPN may identify segment data that includes the flag associating the anonymous identifier with a valued customer of the company. The SPN then identifies the company advertisement associated with the flag and sends the identified company advertisement to the visited website.

Thus, the user of the web browser is provided a customized advertisement from the company without the company or the SPN tracking any of the prior browser history of the user. The SPN may track other anonymous on-line metrics for charging the company. For example, the SPN may track the number of times the company advertisement is sent to a website.

Figure 6:
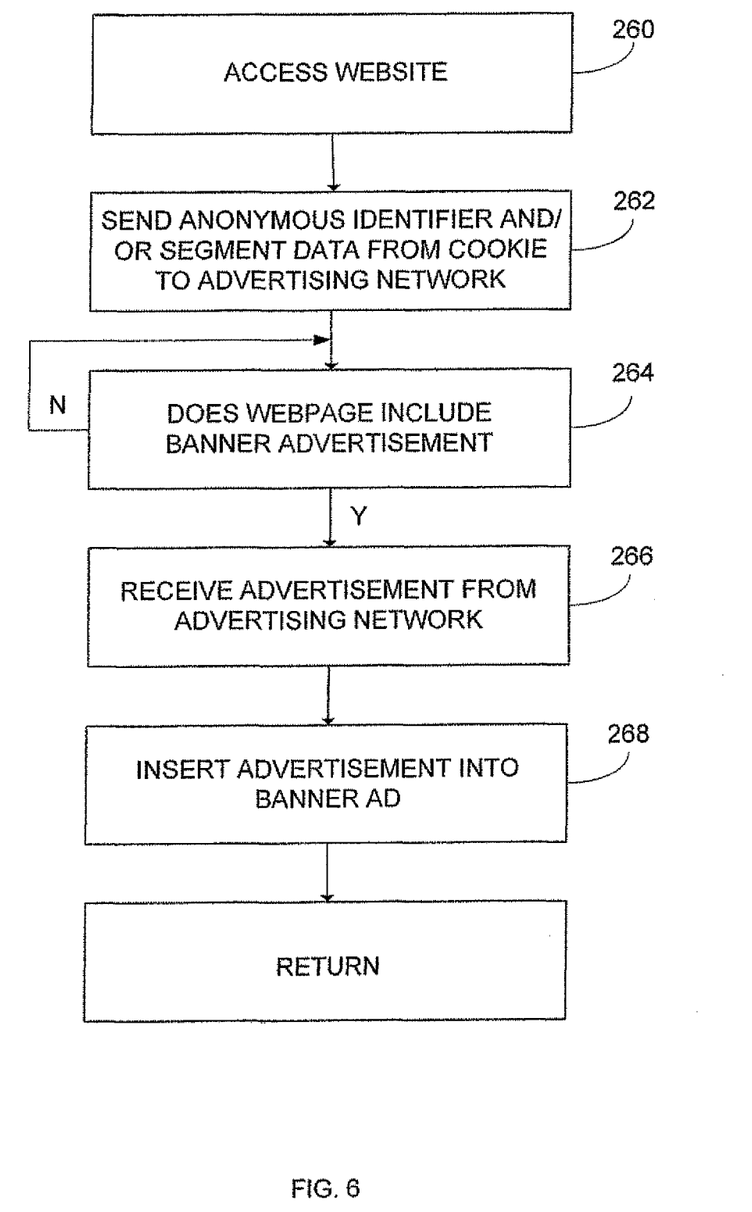
FIG. 6 depicts an example process for sending anonymous identifiers to a service provider network and receiving advertisements.

FIG. 6 depicts an example process for displaying advertisements in a webpage banner ad. In operation 260, a user computer may access a website. The SPN may have loaded the cookie with the anonymous identifier into the user web browser during a previous web session with the publisher website.

In operation 262, the cookie may send the anonymous identifier and/or segment information to the visited website, the SPN, or to some other advertising network. For example, the cookie may include an HTTP link to the SPN. In operation 264, the visited website may determine if a banner advertisement exists on the webpage that will be loaded into the web browser. If the webpage does not contain a banner advertisement, the website may repeat operation 264 and continue to monitor the webpages selected by the user for any banner ads.

If the webpage contains a banner ad in operation 264, the website may receive an advertisement from the SPN. For example, the website may have received an advertisement for displaying to the valued customers of the company. The advertisement may offer the valued customers a discount for renewing their phone service. In operation 268, the visited website may insert the received valued customer advertisement into the banner ad and display the advertisement to the user.

The cookie may send the anonymous identifier to any websites partnered with the SPN or with any other advertising network. The SPN then may use the anonymous identifier and any associated segment data to customize the advertisements or any other information displayed to the user.

Thus, the number of unique users identified by a publisher website can be tracked without tracking the browser history for the users. Further, anonymous identifiers can be loaded into cookies so that customized advertisements and other information can be displayed to users based on generic segment data. The SPN may provide the advertisements and other information also without tracking any user browser history.

Computer

Figure 7:
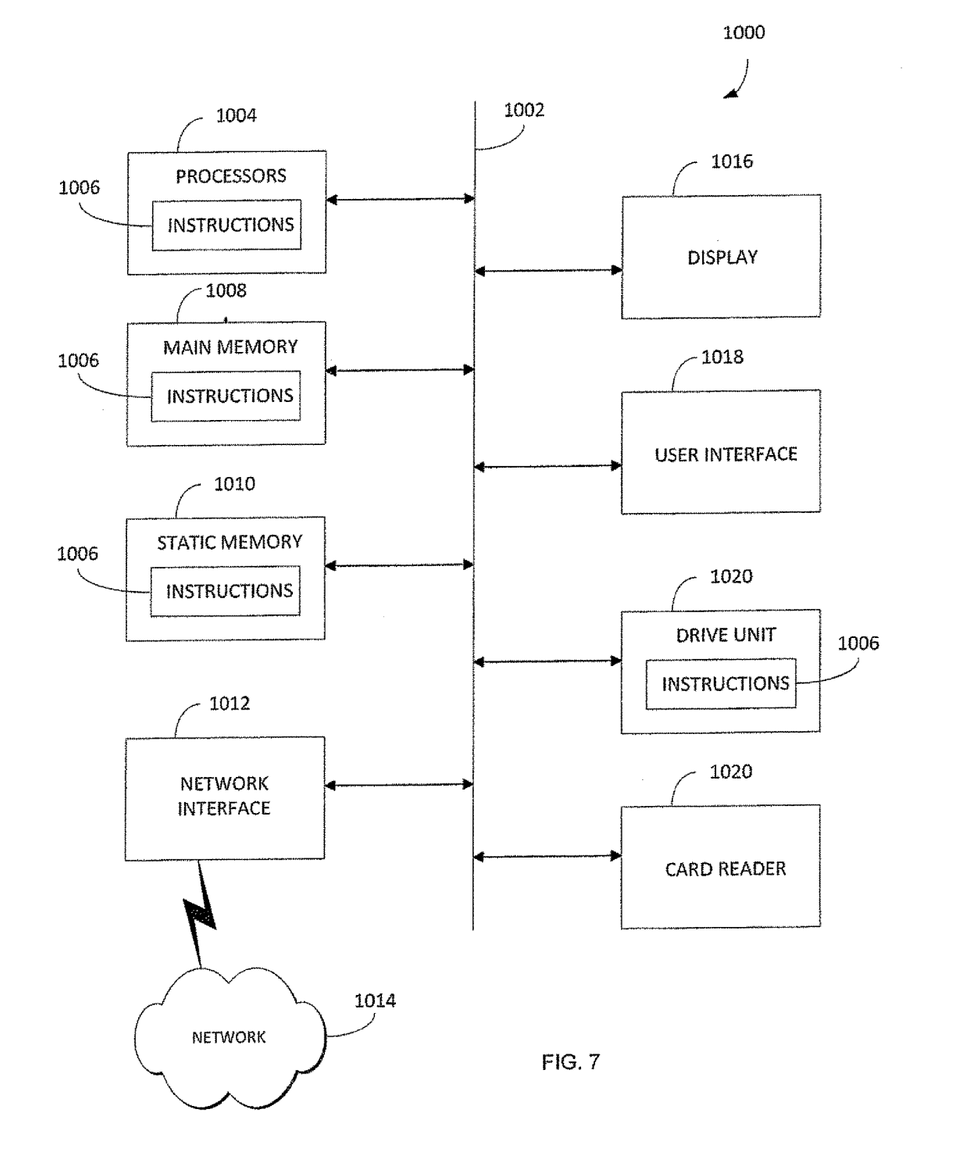
FIG. 7 shows an example computer system that operates the anonymous information system of FIG. 1.

FIG. 7 shows a computing device 1000 executing instructions 1006 for performing any combination of the operations discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet PC, a Personal Digital Assistant (PDA), a cellular telephone, a web appliance, or any machine capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or portable FLASH key fob. The memory and processing device may be operatively coupled together, or in communication with each other, for example by an I/O port, network connection, etc. such that the processing device may read a file stored on the memory.

Associated memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

For the sake of convenience, operations may be described as various interconnected or coupled functional blocks or diagrams. However, there may be cases where these functional blocks or diagrams may be equivalently aggregated into a single logic device, program or operation with unclear boundaries.

Computing device 1000 can further include a video display 1016, such as a liquid crystal display (LCD) or a cathode ray tube (CRT)) and a user interface 1018, such as a keyboard, mouse, or touch screen. All of the components of computing device 1000 may be connected together via a bus 1002 and/or network.

Having described and illustrated the principles of a preferred embodiment, it should be apparent that the embodiments may be modified in arrangement and detail without departing from such principles. Claim 1s made to all modifications and variation coming within the spirit and scope of the disclosure.

The invention claimed is:

1. A method for maintaining privacy in an anonymous information system (AIS), comprising:
   receiving, by a service provider network (SPN), a hashed user identifier from a website;
   hashing, by the SPN, the hashed user identifier to produce a double hashed user identifier;
   identifying a consumer file associated with the double hashed user identifier, wherein the consumer file is stored in a first database;
   identifying an entity identifier associated with the consumer file;
   hashing the entity identifier into an anonymous identifier;
   identifying personally identifiable information (PII) in the consumer file;
   identifying segment data in the consumer file;
   loading the anonymous identifier and the segment data into a second database that is siloed from the first database wherein association of the anonymous identifier with the PII in the consumer file is prevented;
   associating the anonymous identifier only with the segment data;
   at the SPN, loading the anonymous identifier into a browser cookie;
   sending the browser cookie from the SPN to a web browser associated with a computer operated by a user;
   at some point after sending the browser cookie from the SPN to the web browser associated with the computer operated by the user, associating at the SPN the anonymous identifier with an advertisement chosen from a plurality of advertisements based on the segment data associated with the anonymous identifier to provide a targeted advertisement to the user;
   at the SPN, receiving the browser cookie back from the web browser at the computer operated by the user;
   extracting the anonymous identifier from the browser cookie at the SPN; and
   sending the targeted advertisement associated with the anonymous identifier from the SPN to the web browser at the computer operated by the user in response to receiving the anonymous identifier.

2. The method according to claim 1, further comprising the step of discarding the hashed user identifier after double hashing the user identifier.

3. The method according to claim 1, wherein the hashed user identifier comprises a hashed email address.

4. The method according to claim 1, wherein:
   the PII comprises any information identifying a single human, a group of humans, or an entity; and
   the segment data comprises generic information that cannot be tracked to the single human, the group of humans, or the entity.

5. The method according to claim 1, further comprising:
   associating the segment data with an advertisement chosen from a plurality of advertisements to identify a targeted advertisement to the user;
   at the SPN, loading at least a portion of the segment data into the browser cookie along with the anonymous identifier;
   loading the browser cookie comprising the anonymous identifier and the portion of the segment data into the web browser at the computer operated by the user from the SPN;
   at some time after loading the browser cookie into the web browser from the SPN, receiving the browser cookie from the web browser at the SPN and extracting the portion of the segment data from the browser cookie at the SPN; and
   sending the targeted advertisement associated with the segment data from the SPN to the web browser in response to receiving the associated segment data at the SPN.

6. The method according to claim 1, wherein the website is a publisher website, the hashed user identifier is a hashed first email address, and the double hashed user identifier is a first double hashed email address, further comprising the steps of:
   a. receiving, by the SPN, a second hashed email address from the publisher website;
   b. double hashing, by the SPN, the second hashed email address to produce a second double hashed email address;
   c. determining whether the second double hashed email address currently exists in a publisher file maintained at the SPN;

d. if the second double hashed email address does not currently exist in the publisher file, incrementing an email count for the publisher website; and e. determining a publication fee paid to the publisher website based on a number of unique double hashed email addresses in the publisher file.

7. The method according to claim 1, wherein the advertisement is a banner advertisement on a web page.

8. The method according to claim 1, further comprising the step of, at an advertiser website, associating a first advertisement with a first set of segment data and associating a second advertisement different from the first advertisement with a second set of segment data different from the first set of segment data.

9. The method according to claim 1, wherein the advertisement is associated with an upgrade offer to preferred customers of an advertiser entity.

10. The method according to claim 7, wherein the advertisement is a banner ad inserted within a webpage currently loaded in the web browser.

11. The method of according to claim 1, wherein all steps are performed without tracking of a user browser history.

12. The method according to claim 1, wherein the SPN monitors a number of times the advertisement is sent to the web browser.

* * * * *